United States Patent
Yamamoto et al.

(10) Patent No.: US 10,274,931 B2
(45) Date of Patent: Apr. 30, 2019

(54) CELL CONTROL APPARATUS WHICH PREDICTS FAILURE OF MANUFACTURING MACHINES AND PRODUCTION SYSTEM

(71) Applicant: FANUC CORPORATION, Yamanashi (JP)

(72) Inventors: Tomoyuki Yamamoto, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 218 days.

(21) Appl. No.: 15/363,214

(22) Filed: Nov. 29, 2016

(65) Prior Publication Data

US 2017/0153625 A1    Jun. 1, 2017

(30) Foreign Application Priority Data

Nov. 30, 2015  (JP) .................. 2015-233408

(51) Int. Cl.
| | |
|---|---|
| *B25J 9/16* | (2006.01) |
| *G05B 19/418* | (2006.01) |
| *G05B 19/4063* | (2006.01) |
| *G05B 19/4065* | (2006.01) |

(52) U.S. Cl.
CPC ........ *G05B 19/4063* (2013.01); *B25J 9/1674* (2013.01); *G05B 19/4065* (2013.01); *G05B 19/4184* (2013.01); *G05B 19/41815* (2013.01); *G05B 2219/31356* (2013.01); *G05B 2219/32229* (2013.01); *G05B 2219/32371* (2013.01);

(Continued)

(58) Field of Classification Search
None
See application file for complete search history.

(56) References Cited

U.S. PATENT DOCUMENTS

| | | | |
|---|---|---|---|
| 7,467,841 B2 | 12/2008 | Kamisuwa et al. | |
| 8,185,346 B2 | 5/2012 | Sjöstrand et al. | |
| 2017/0351243 A1* | 12/2017 | Sawada | .............. G05B 19/4065 |

(Continued)

FOREIGN PATENT DOCUMENTS

| | | |
|---|---|---|
| CN | 101140469 A | 3/2008 |
| CN | 101256404 A | 9/2008 |

(Continued)

OTHER PUBLICATIONS

Notification of Reasons for Refusal for Japanese Application No. 2015-233408, dated Sep. 19, 2017, including English translation, 4 pages.

*Primary Examiner* — Whitney Moore
(74) *Attorney, Agent, or Firm* — RatnerPrestia

(57) ABSTRACT

A cell control apparatus comprises an operation information acquisition unit which acquires operation information of manufacturing machine, a failure prediction unit which predicts a failure time of the manufacturing machine based on the operation information of the manufacturing machine, and a replacement time acquisition unit which acquires a replacement time of the component from a component management apparatus. When the failure time is earlier than the replacement time, the cell control apparatus performs a control for reducing an operation load of the manufacturing machine on which a failure of the component is predicted so that the failure time is later than the replacement time.

3 Claims, 3 Drawing Sheets

(52) U.S. Cl.
CPC ............... *Y02P 90/02* (2015.11); *Y02P 90/12* (2015.11); *Y02P 90/14* (2015.11); *Y02P 90/30* (2015.11)

(56) References Cited

U.S. PATENT DOCUMENTS

| 2018/0232161 A1* | 8/2018 | Franke | G06F 3/0629 |
| 2018/0321672 A1* | 11/2018 | Cella | G05B 23/024 |

FOREIGN PATENT DOCUMENTS

| JP | 3530263 | 5/2004 |
| JP | 2004-202624 A | 7/2004 |
| JP | 2004334509 A | 11/2004 |
| JP | 2005258585 A | 9/2005 |
| JP | 2009237714 A | 10/2009 |

* cited by examiner

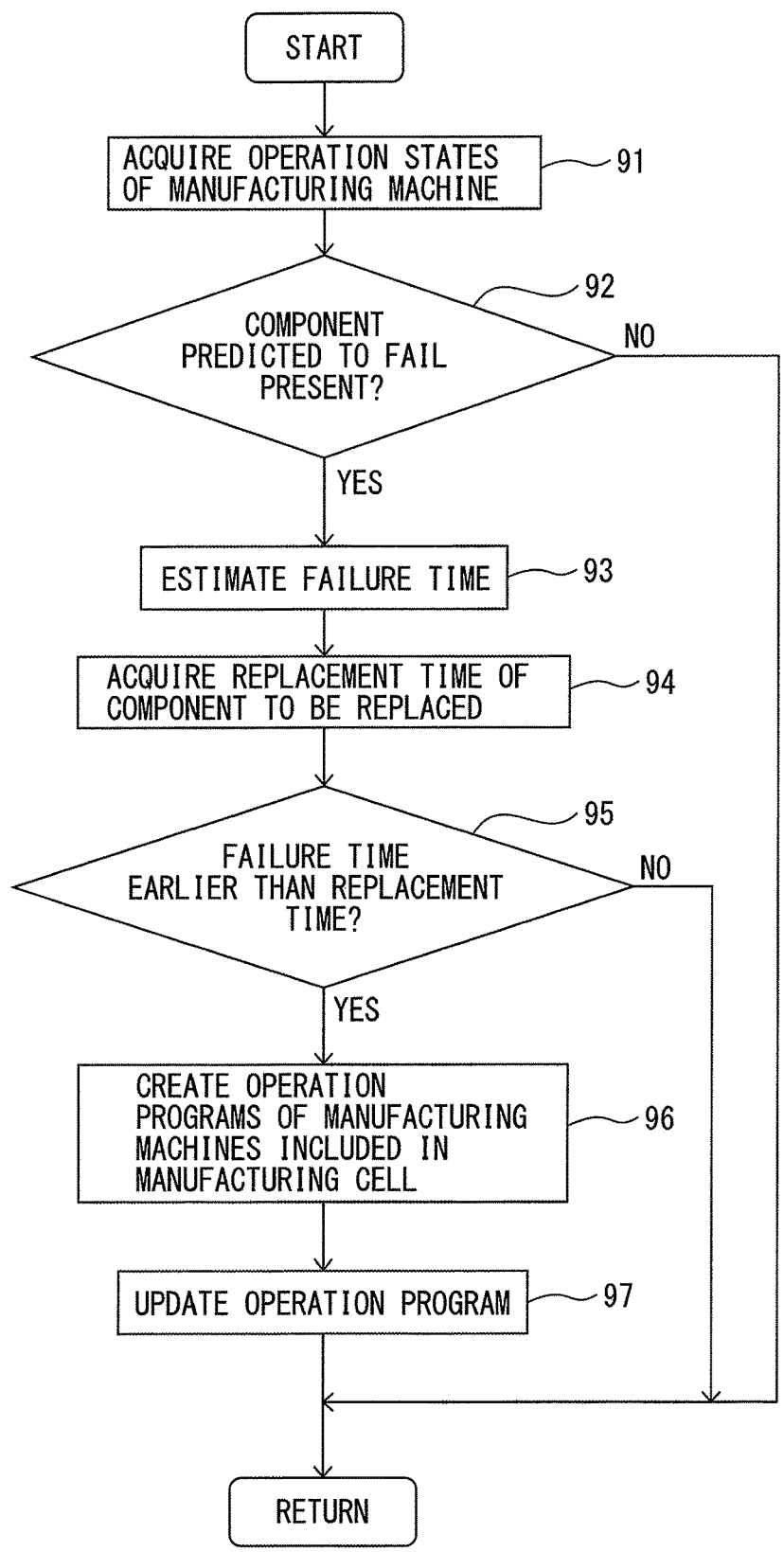

CELL CONTROL APPARATUS WHICH PREDICTS FAILURE OF MANUFACTURING MACHINES AND PRODUCTION SYSTEM

BACKGROUND OF THE INVENTION

1. Field of the Invention

The present invention relates to a cell control apparatus which predicts a failure of a manufacturing machines and a production system including the cell control apparatus.

2. Description of the Related Art

Hitherto, it has been known that in a manufacturing factory, an operation of machining or welding components, or the like is performed by a manufacturing machine so that productivity is improved. Moreover, in manufacturing a product, there are cases in which more than one manufacturing machine is used. Each manufacturing machine is controlled by a control apparatus of the manufacturing machines. It is known that the control apparatus of the plurality of manufacturing machines drives the manufacturing machines based on a command from a host control apparatus.

Japanese Unexamined Patent Publication No. 2004-202624 discloses an apparatus which collects information from a plurality of robots connected to a network and store the same in a database. When the predetermined robot fails, the apparatus predicts the robot having a possibility of a failure based on information of the robots which is registered in advance and individual information of the robots which is acquired in real-time. In addition, this publication discloses extracting a candidate for a required component when the apparatus fails.

Japanese Patent No. 3530263 discloses a method in which while one robot fails to operate, an operation is substitutively performed by the other robot having an operable area overlapping with that of the robot since the failure occurs.

SUMMARY OF THE INVENTION

There are cases in which the manufacturing machine fails due to use for many years or malfunction of a component. For example, a drive unit of the manufacturing machines includes a component which rotates or moves in a predetermined direction. Consequently, the drive unit may fail due to application of a force or sliding. In another way, there are cases in which due to long time use, a lifetime of a component comes to an end so that the component fails.

In a factory which manufactures a product using the plurality of manufacturing machines, and the like, there are cases in which even if one component fails, the manufacturing machines can be no longer used. There are cases in which since one manufacturing machine can be no longer used, manufacturing a product in a production line must be stopped. In other words, there are cases in which until a substitute for the failing component arrives, a restart of manufacturing must be awaited. In such a case, productivity of the factory remarkably decreases.

When a prediction of a failure of a component of the manufacturing machines is performed, during a normal operation of the manufacturing machines, a component regarding which a failure is predicted can be ordered. However, a delivery time of the component regarding which a failure is predicted differs depending on components. When a component delivery requires time, the component may be delivered after the manufacturing machines fail. In this case, until the component is delivered, the manufacturing machines may not be used.

The cell control apparatus of the present invention is a cell control apparatus which controls a manufacturing cell including a plurality of manufacturing machines and comprises an operation information acquisition unit which acquires operation information of the manufacturing machine. The cell control apparatus comprises a failure prediction unit which predicts a failure time of a component of the manufacturing machine based on the operation information of the manufacturing machine and transmits information on the component predicted to fail to a component management apparatus which performs management of a component of the manufacturing machine. The cell control apparatus comprises a replacement time acquisition unit which acquires a replacement time which is a time at which the component can be replaced from the component management apparatus. The cell control apparatus judges whether or not the failure time is earlier than the replacement time. The cell control apparatus comprises a work adjustment unit which performs a control for reducing an operation load of the manufacturing machine on which a failure of the component is predicted so that the failure time is later than the replacement time when the failure time is earlier than the replacement time.

In the invention as described above, the work adjustment unit can perform the control for reducing an operation of the manufacturing machine on which the failure of the component is predicted and perform a control so that the other manufacturing machine performs the operation as reduced.

In the invention as described above, the work adjustment unit can create an operation program of the manufacturing machine on which the failure of the component is predicted and an operation program of the other manufacturing machine and transmit the operation programs to machine control apparatuses of the respective manufacturing machines.

The production system of the present invention comprises the cell control apparatus as described above, the manufacturing cell including the plurality of manufacturing machines, and the component management apparatus which performs management of the component of the manufacturing machine. The cell control apparatus transmits information on the component predicted to fail to the component management apparatus through a network and acquires the replacement time from the component management apparatus.

BRIEF DESCRIPTION OF THE DRAWINGS

FIG. 4 is a flowchart of a control of the production system according to the embodiment.

DETAILED DESCRIPTION

A cell control apparatus and a production system comprising the cell control apparatus according to an embodiment will be described with reference to FIG. 1 to FIG. 4.

Figure 1:
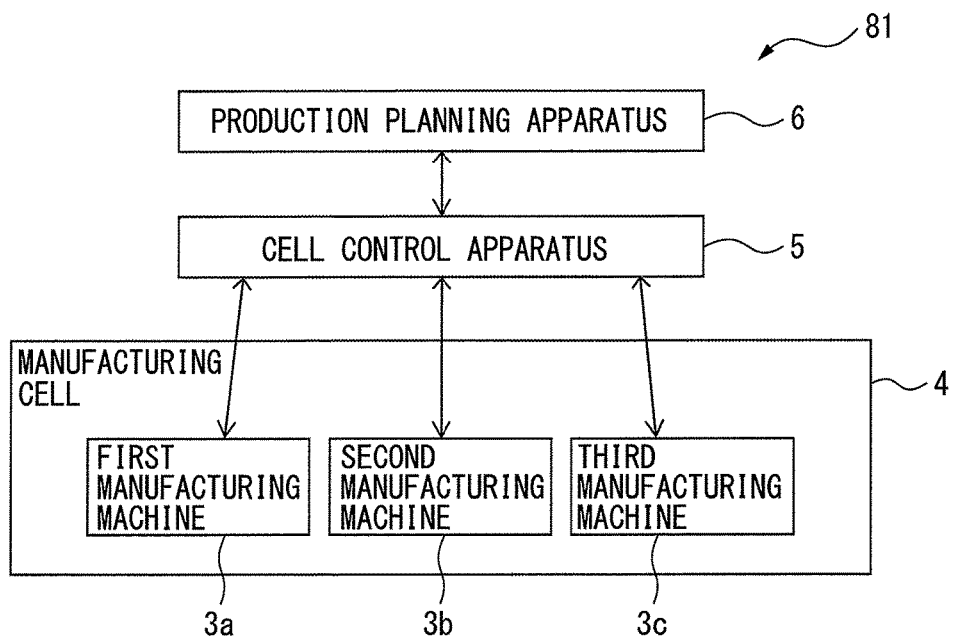
FIG. 1 is a block diagram of a production system according to an embodiment.

FIG. 1 is a block diagram of the production system according to the present embodiment. A production system 81 according to the present embodiment comprises a manufacturing cell 4 including a plurality of manufacturing machines 3*a*, 3*b*, 3*c*. The manufacturing cell 4 is an assembly of the plurality of manufacturing machines for performing a predetermined operation. The manufacturing cell 4 according to the present embodiment includes a first manufacturing machine 3a, a second manufacturing machine 3b, and a third manufacturing machine 3c.

The production system 81 comprises a cell control apparatus 5 which controls the manufacturing cell 4. The manufacturing machines 3a, 3b, 3c comprise machine control apparatuses which control the manufacturing machines. The cell control apparatus 5 is formed in such a manner as to be able to intercommunicate with the machine control apparatuses which control the manufacturing machines 3a, 3b, 3c. The cell control apparatus 5 acquires states of operation of the manufacturing machines 3a, 3b, 3c from the machine control apparatuses and transmits a command to the machine control apparatuses.

The production system 81 comprises a production planning apparatus 6 formed in such a manner as to be communicable with the cell control apparatus 5. The production planning apparatus 6 according to the present embodiment functions as a component management apparatus which performs management of a component of the manufacturing machines 3a, 3b, 3c. The production planning apparatus 6 according to the present embodiment is formed in such a manner as to perform management of a process of the entirety of a factory and management of production of a product.

In the present embodiment, the manufacturing cell 4 is disposed in the factory which manufactures the product. On the other hand, the cell control apparatus 5 and the production planning apparatus 6 may be disposed in a building different from the factory. For example, the cell control apparatus 5 may be disposed in another building located in a site of the manufacturing factory. In this case, the cell control apparatus 5 and the machine control apparatuses can be connected through a network, such as an intranet. In addition, the production planning apparatus 6 may be disposed in an office located in an area distant from the manufacturing factory. For example, the production planning apparatus 6 is connected in a manner intercommunicable with the cell control apparatus 5 through a network, such as an internet.

Figure 2:
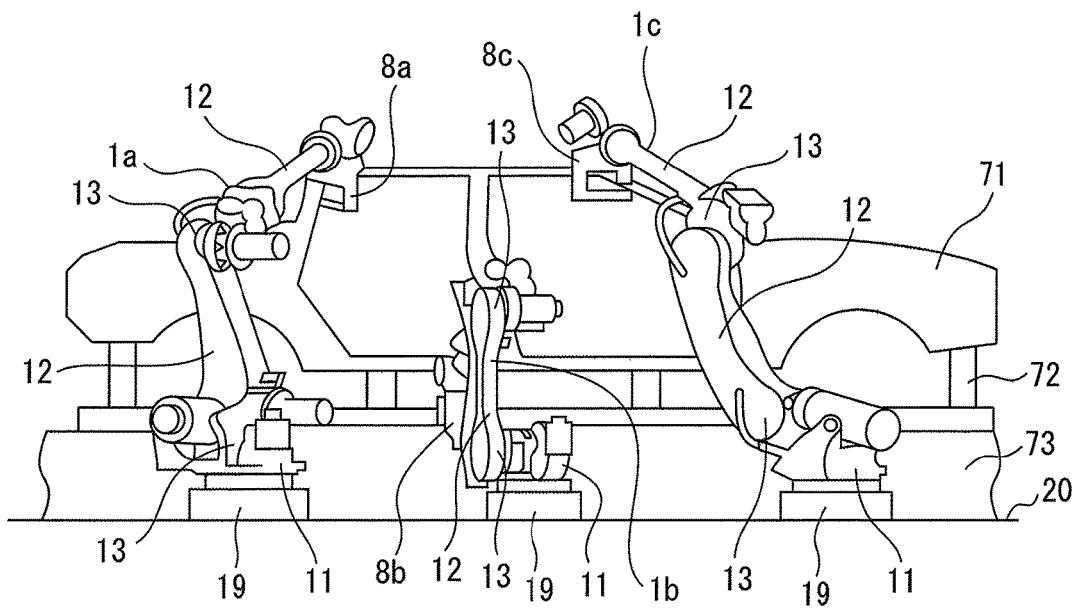
FIG. 2 is a schematic diagram of manufacturing machines of a manufacturing cell according to the embodiment.

FIG. 2 is a schematic diagram when an operation is performed in the manufacturing cell according to the embodiment. With reference to FIG. 1 and FIG. 2, the manufacturing machines 3a, 3b, 3c according to the present embodiment are a welding machine which automatically performs welding based on an operation program. The first manufacturing machine 3a includes a first robot 1a and a first welding gun 8a. The second manufacturing machine 3b includes a second robot 1b and a second welding gun 8b. The third manufacturing machine 3c includes a third robot 1c and a third welding gun 8c. The product which is a target of the operation in the present embodiment is a vehicle body 71 of an automobile. In the present embodiment, the operation of performing spot welding at a plurality of spots of the vehicle body 71 will be described as an example.

The vehicle body 71 is supported by a holder 72. The holder 72 is conveyed by a conveyor 73. The vehicle body 71 is conveyed to a predetermined position and stopped. The robots 1a, 1b, 1c drive to perform spot welding at a plurality of points. The spots of the points at which spot welding is performed are determined in advance.

In the robots 1a, 1b, 1c according to the present embodiment, the adjoining robots are adjacent. The robots and the welding guns are each formed in such a manner as to be capable of performing at least a part of the operation to be performed by the neighbor robots. For example, a part of the welding points to be performed by the first manufacturing machine 3a is formed in such a manner as to be capable of being welded by the second manufacturing machine 3b. Similarly, a part of the welding points to be performed by the second manufacturing machine 3b is formed in such a manner as to be capable of being welded by the first manufacturing machine 3a.

Thus, in the plurality of manufacturing machines 3a, 3b, 3c, at least a part of operable range in which the operation can be performed overlaps. The manufacturing machines 3a, 3b, 3c are formed in such a manner as to be capable of performing the operation of the neighbor manufacturing machines.

Figure 3:
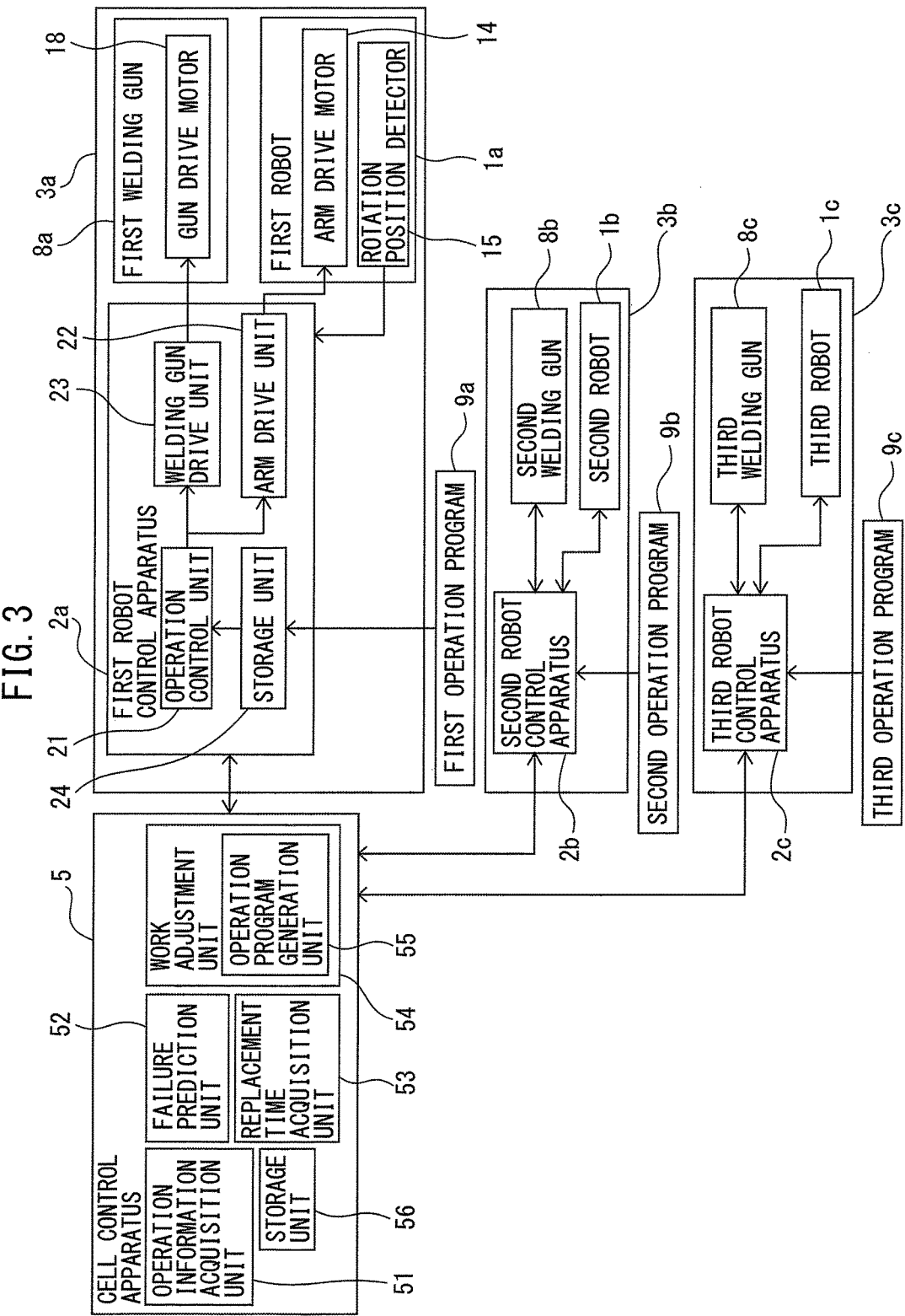
FIG. 3 is a block diagram of a cell control apparatus and the manufacturing cell according to the embodiment.

FIG. 3 is a block diagram of the cell control apparatus and the manufacturing cell according to the present embodiment. With reference to FIG. 1 to FIG. 3, the first manufacturing machine 3a includes a first robot control apparatus 2a which controls the first robot 1a and the first welding gun 8a. The first robot 1a supports the first welding gun 8a serving as an end effector. The first robot 1a according to the present embodiment is a multi-articulated robot including an arm 12 and a plurality of joint portions 13.

The first robot 1a includes an arm drive apparatus which drives the arm 12. The arm drive apparatus includes an arm drive motor 14 which changes a posture of the arm 12. The arm drive motor 14 drives so that the arm 12 can be directed into a desired direction by the joint portions 13. The first robot 1a includes a base portion 19 which supports the arm 12 and a turning portion 11 which turns relative to the base portion 19. The base portion 19 is fixed to an installation surface 20. The turning portion 11 turns about a rotation axis extending in a vertical direction. The turning portion 11 rotates so that the direction of the arm 12 can be changed. The arm drive apparatus includes a drive motor which drives the turning portion 11.

The first welding gun 8a is formed in such a manner as to be capable of performing spot welding by supplying electricity to a tip arranged at an end. The first welding gun 8a includes a gun drive motor 18 which moves the tip. Note that as the end effector, which is not limited to the welding gun, an arbitrary apparatus can be connected to the robot in accordance with a desired operation.

The first robot 1a includes a state detector which detects a movement of the arm 12. The first robot control apparatus 2a detects, through an output of the state detector, a position and a posture of the first robot 1a. The state detector according to the present embodiment includes a rotation position detector 15 mounted to the arm drive motor 14. The rotation position detector 15 detects a rotation position when the arm drive motor 14 drives. The posture of the arm 12 at the joint portions 13 can be detected based on each rotation position of the arm drive motor 14. In addition, the state detector includes a rotation position detector mounted to the drive motor which drives the turning portion 11. The direction in which the arm 12 extends can be detected based on a rotation position of the turning portion 11.

The second robot 1b and the third robot 1c have a configuration similar to that of the first robot 1a. In addition, the second welding gun 8b and the third welding gun 8c have a configuration similar to that of the first welding gun 8a.

The first robot control apparatus 2a includes a calculation processing apparatus including a CPU (central processing unit), a RAM (random access memory), a ROM (read only memory), and the like connected to each other through a bus. The first robot control apparatus 2a drives the first robot 1a and the first welding gun 8*a* based on a first operation program 9*a* created in advance. The first robot control apparatus 2*a* includes a storage unit 24 which stores arbitrary information, such as the first operation program 9*a*.

The first robot control apparatus 2*a* includes an operation control unit 21. The operation control unit 21 transmits an operation command for driving the first robot 1*a* and the first welding gun 8*a*. The operation control unit 21 transmits an operation command for driving the first robot 1*a* to an arm drive unit 22. The arm drive unit 22 includes an electric circuit which drives a motor, such as the arm drive motor 14. The arm drive unit 22 supplies electricity to the arm drive motor 14 and the like based on the operation command so as to drive the arm. In addition, the operation control unit 21 transmits an operation command for driving the first welding gun 8*a* to a welding gun drive unit 23. The welding gun drive unit 23 includes an electric circuit which drives the gun drive motor 18 and an electric circuit which supplies electricity to the tip. The welding gun drive unit 23 supplies electricity to the gun drive motor 18 and the like based on the operation command.

The second manufacturing machine 3*b* includes a second robot control apparatus 2*b*. Further, the third manufacturing machine 3*c* includes a third robot control apparatus 2*c*. The second robot control apparatus 2*b* and the third robot control apparatus 2*c* have a configuration similar to that of the first robot control apparatus 2*a*. The robot control apparatuses 2*a*, 2*b*, 2*c* function as the machine control apparatuses which control the respective manufacturing machines.

A second operation program 9*b* created in advance is inputted into the second robot control apparatus 2*b*. A third operation program 9*c* created in advance is inputted into the third robot control apparatus 2*c*. The robots 1*b*, 1*c* and the welding guns 8*b*, 8*c* are controlled based on the operation programs 9*b*, 9*c*, respectively.

The cell control apparatus 5 and the production planning apparatus 6 according to the present embodiment are configured with a calculation processing apparatus including a CPU, an RAM, and the like. The cell control apparatus 5 includes an operation information acquisition unit 51 which acquires operation information of the plurality of manufacturing machines 3*a*, 3*b*, 3*c*. The operation information of the manufacturing machines 3*a*, 3*b*, 3*c* includes variables indicating a state of drive of the respective robots 1*a*, 1*b*, 1*c* and variables indicating a state of drive of the respective welding guns 8*a*, 8*b*, 8*c*.

For example, the operation information includes a value of a current supplied to the drive motors or the tips of the welding guns, an output of the rotation position detector 15 mounted to the drive motor, an output of a sensor mounted to the robots and the welding guns, and the like. In addition, the drive motor which drives the arm 12 according to the present embodiment performs a feedback control. The operation information includes a signal in the interior of the robot control apparatuses 2*a*, 2*b*, 2*c*, such as a signal of the feedback control. Further, the operation information includes a signal inputted into and a signal outputted from the robot control apparatuses 2*a*, 2*b*, 2*c*.

The operation information acquisition unit 51 acquires the operation information of the manufacturing machines 3*a*, 3*b*, 3*c* at predetermined time intervals. The cell control apparatus 5 includes a storage unit 56 which stores predetermined information. The storage unit 56 stores the operation information acquired.

The cell control apparatus 5 includes a failure prediction unit 52 which predicts a failure time of a component of the manufacturing machines 3*a*, 3*b*, 3*c* based on the operation information of the manufacturing machines 3*a*, 3*b*, 3*c*. The failure prediction unit 52 estimates a component predicted to fail in the future and the failure time of the component based on the operation information stored in the storage unit 56.

For example, there are cases in which, the arm drive motor 14 fails in the robots 1*a*, 1*b*, 1*c*. Herein, as the component which may fail, the arm drive motor 14 will be described as an example. The robot control apparatuses 2*a*, 2*b*, 2*c* according to the present embodiment perform the feedback control of the arm drive motor 14 based on a rotation position outputted by the rotation position detector 15. The operation control unit 21 can generate a speed command based on the operation program. On the other hand, the rotation position detector 15 detects an actual rotation angle of the arm drive motor 14. The rotation position detector 15 can calculate an actual speed based on the actual rotation angle. The operation control unit 21 can modify the speed command based on the operation program based on the actual speed.

If the arm drive motor 14 fails, a difference between the speed command based on the operation program and the actual speed becomes large. Accordingly, the failure prediction unit 52 can predict a failure based on the difference between the speed command based on the operation program and the actual speed.

For example, the storage unit 56 of the cell control apparatus 5 stores a speed difference between the speed command based on the operation program and the actual speed at predetermined time intervals. The storage unit 56 stores in advance a judgement value of the speed difference regarding a failure and a tolerance value which is a border of a normal range. When the speed difference exceeds the tolerance value, the failure prediction unit 52 calculates an increase speed of the speed difference based on past data. The failure prediction unit 52 can estimate a time at which the speed difference exceeds the judgement value using the increase speed. The failure prediction unit 52 can set the time at which the speed difference exceeds the judgement value as the failure time at which the arm drive motor 14 fails. Note that the failure prediction unit 52 may estimate the failure time based on a position command and an actual position detected by the rotation position detector 15.

Further, in another estimation control of the failure time, a vibration of the arm drive motor 14 generated at the time when the arm drive motor 14 fails is used. The rotation position detector 15 can detect the vibration based on a rotation position of the arm drive motor 14. Alternatively, a vibration sensor may be mounted to the arm drive motor 14. The storage unit 56 can store the vibration of the arm drive motor 14 at predetermined time intervals. Particularly, the storage unit 56 can store an amplitude of a vibration of a specific frequency component. When a failure starts occurring, the amplitude of the specific frequency component increases. The storage unit 56 stores in advance a judgement value of the amplitude of the specific frequency component.

The failure prediction unit 52 can calculate an increase speed of the amplitude of the vibration of the specific frequency component based on past data. The failure prediction unit 52 can calculate a time at which the amplitude of the vibration of the specific frequency component exceeds the judgement value. The failure prediction unit 52 can estimate the time at which the amplitude of the vibration of the specific frequency component exceeds the judgement value as the failure time.

Thus, the failure prediction unit 52 calculates a variation speed based on past data with respect to a variable in which a value varies when a component fails. The failure prediction unit 52 can predict the failure time based on the variation speed of a predetermined variable and a predetermined judgement value.

As the component on which a failure is predicted, which is not limited to the arm drive motor, an arbitrary component constituting the manufacturing machines can be selected. The component on which a failure is predicted can be selected in advance and stored in the storage unit. For example, a reduction gear mounted to a driving part can be selected as the component on which a failure is estimated. Note that a control for estimating a failure of the component is not limited to the configuration herein, but the failure prediction unit can predict the failure time using an arbitrary process.

The failure prediction unit 52 transmits information on the component of the manufacturing machines 3a, 3b, 3c on which a failure is predicted, such as a name, a component number, and the like of the component to the production planning apparatus 6.

The production planning apparatus 6 according to the present embodiment automatically orders the component of the manufacturing machines based on the information of the component on which a failure is predicted to occur. For example, when the arm drive motor 14 is predicted to fail, an arm drive motor serving as a substitute is ordered. When ordering the component, the production planning apparatus 6 acquires a time at which the component arrives at the factory in which the manufacturing cell is disposed. In other words, the production planning apparatus 6 acquires a replacement time which is a time at which the component predicted to fail can be replaced.

Note that ordering the component and acquiring the replacement time are not limited to the configuration herein, but an operator may judge information outputted by the production planning apparatus 6 and the operator may order the component. The operator may acquire the replacement time of the component and input the same into the production planning apparatus 6.

The cell control apparatus 5 includes a replacement time acquisition unit 53 which acquires the replacement time of the component predicted to fail. The replacement time acquisition unit 53 acquires the replacement time from the production planning apparatus 6.

The cell control apparatus 5 includes a work adjustment unit 54 which adjusts an operation load of the plurality of manufacturing machines 3a, 3b, 3c. In the present embodiment, when a failure is not predicted in the manufacturing machines 3a, 3b, 3c, distribution of the points is set so that the plurality of manufacturing machines 3a, 3b, 3c start the operation at the same time and finish the operation substantially at the same time.

The work adjustment unit 54 judges whether or not the failure time estimated is earlier than the replacement time. When the failure time is later than the replacement time, the operator can immediately replace the component when the manufacturing machines fail. Alternatively, the operator can replace the component before a failure occurs. Consequently, manufacturing can be continued without a great influence on manufacturing the product. In each manufacturing machine, the current operation load is maintained. In the present embodiment, current distribution of the points is maintained and a welding operation is continued in each of the manufacturing machines 3a, 3b, 3c.

However, when the failure time is earlier than the replacement time, if the manufacturing machines fail, the manufacturing machines can be no longer used. When the failure time is earlier than the replacement time, the work adjustment unit 54 performs a control for reducing an operation load with respect to the manufacturing machine on which a failure of the component is predicted. Further, the work adjustment unit 54 sets the operation so that the failure time of the component is later than the replacement time.

A process of reducing an operation load can be determined in advance. For example, a control for stopping a part of the operation or reducing an operation speed of the robot is performed. The operation of reducing the operation speed of the robot is suitable when there is sufficient time in the manufacturing machine on which a failure is predicted. Next, in the manufacturing machine on which a failure is predicted, the control for stopping a part of the operation will be described.

As described above, the manufacturing cell 4 according to the present embodiment is formed so that the operable ranges of the manufacturing machines 3a, 3b, 3c adjoining each other overlap. In other words, the manufacturing machines are formed in such a manner as to be capable of performing welding at least a part of the welding points performed by the manufacturing machines adjacently disposed. In each manufacturing machine, the operation which can be performed is determined in advance. The storage unit 56 of the cell control apparatus 5 stores the operations which can be performed by the respective manufacturing machines 3a, 3b, 3c.

With reference to FIG. 2, in the present embodiment, a case in which a component of the first robot 1a is predicted to fail will be described as an example. When the component of the first robot 1a is predicted to fail, the operation at apart of the points among the plurality of welding points performed by the first manufacturing machine 3a is stopped. The work adjustment unit 54 according to the present embodiment performs a control for reducing the number of parts to be welded by the first manufacturing machine 3a. The points at which the operation is stopped are points at which the second manufacturing machine 3b can weld.

In the storage unit 56, with respect to the component predicted to fail, a relationship between a reduction amount of an operation load and a decrease amount of a speed at which a failure progresses is stored in advance. The work adjustment unit 54 can set the reduction amount of the operation load in accordance with the speed at which the failure progresses. The work adjustment unit 54 performs a control for more increasing the reduction amount of the operation load as the speed at which the failure progresses is higher. For example, the work adjustment unit 54 can perform a control for more reducing the number of the points as the increase speed of the amplitude of the vibration of the drive motors is higher.

In this case, the work adjustment unit 54 can set the reduction amount of the operation load so that the failure time is later than the replacement time. For example, the work adjustment unit 54 sets a time later than the replacement time. The work adjustment unit 54 calculates the speed at which the failure progresses so that the failure occurs at the time as set. The work adjustment unit 54 can set the reduction amount of the operation load based on the calculated speed at which the failure progresses.

The work adjustment unit 54 controls the other manufacturing machines in such a way that the operation as reduced in the manufacturing machine on which a failure of the component is predicted is performed by the other manufacturing machines. The work adjustment unit 54 performs a control for transferring a part of the operation of the manufacturing machine containing the component predicted to fail to the other manufacturing machines. For example, the work adjustment unit 54 performs control so that the welding operation at a part of the points at which the first manufacturing machine 3*a* has stopped welding is performed by the second manufacturing machine 3*b*.

The control for transferring the operation is not limited to the configuration herein, but the reduction amount of the operation load may be set in advance in accordance with a failing component and a type of a failure. For example, the welding points transferred from the first manufacturing machine to the second manufacturing machine can be determined in advance in accordance with a failing component. In this control, transferring the operation at as many points as possible is preferable so that the failure time is later than the replacement time.

The work adjustment unit 54 according to the present embodiment comprises an operation program generation unit 55. The control for reducing the operation load of the manufacturing machine on which a failure is predicted and the control for transferring the operation to the other manufacturing machine in the present embodiment can be performed by rewriting the operation program.

The operation program generation unit 55 creates the operation program of the manufacturing machine on which a failure of a component is predicted. Further, the operation program generation unit 55 creates the operation programs of the other manufacturing machines to which the operation is transferred. Then, the work adjustment unit 54 transmits the operation programs to the machine control apparatuses of the respective manufacturing machines.

For example, when it is predicted that a component of the first robot 1*a* fails, the work adjustment unit 54 transmits the first operation program in which the number of the welding points performed by the first manufacturing machine 3*a* is reduced to the first robot control apparatus 2*a*. The storage unit 24 of the first robot control apparatus 2*a* updates the first operation program. Further, the work adjustment unit 54 transmits the second operation program in which the number of the welding points performed by the second manufacturing machine 3*b* is increased to the second robot control apparatus 2*b*. A storage unit of the second robot control apparatus 2*b* updates the second operation program. By this control, the operation performed by the plurality of manufacturing machines can be distributed. Note that the entirety of the operation of the manufacture machine on which a failure is predicted may be transferred to the other manufacturing machines.

As the control for transferring a part or the entirety of the operation of the manufacturing machine on which a failure is predicted to the other manufacturing machines, which is not limited to the configuration herein, an arbitrary control can be adopted. For example, each robot control apparatus may store in advance a plurality of operation programs in accordance with a pattern of the points. The work adjustment unit can transmit the positions of the points to the robot control apparatuses and the robot control apparatuses can select the operation program based on the positions of the points.

Alternatively, the robot control apparatuses can store elements of an operation program with respect to each point. The robot control apparatuses may combine elements of a plurality of operation programs so as to create one operation program based on the spots of the points transmitted from the work adjustment unit.

FIG. 4 is a flowchart of a control of the production system according to the present embodiment. In step 91, the operation information acquisition unit 51 of the cell control apparatus 5 acquires operation states of the respective manufacturing machines 3*a*, 3*b*, 3*c*.

In step 92, the failure prediction unit 52 acquires the operation states of the respective manufacturing machines 3*a*, 3*b*, 3*c*. The failure prediction unit 52 detects a component expected to fail. The failure prediction unit 52 can judge whether or not a failure is predicted based on a predetermined variable of components. For example, when the amplitude of the vibration of the drive motors is below a predetermined tolerance value, the failure prediction unit 52 can judge that the drive motors are normal. The failure prediction unit 52 can judge that a failure is not predicted on the drive motors.

In step 92, when no component predicted to fail is detected, the control terminates. In other words, when all the components of the manufacturing machines are normal, the control terminates. In step 92, when a component predicted to fail is detected, the control advances to step 93.

In step 93, the failure prediction unit 52 estimates the failure time of the component detected. The failure prediction unit 52 transmits information of the component predicted to fail to the production planning apparatus 6. The production planning apparatus 6 orders the component and acquires a time at which the component is delivered to the factory. In other words, the production planning apparatus 6 sets the replacement time at which the component can be replaced in the factory. In step 94, the replacement time acquisition unit 53 acquires the replacement time from the production planning apparatus 6.

Next, in step 95, the work adjustment unit 54 judges whether or not the failure time is earlier than the replacement time. When the replacement time and the failure time are the same, or when the failure time is later than the replacement time, the control terminates. When the failure time is earlier than the replacement time, the control advances to step 96.

In step 96, the operation program generation unit 55 of the work adjustment unit 54 creates the operation programs in which the operation has been changed with respect to the respective manufacturing machines 3*a*, 3*b*, 3*c*. With respect to the manufacturing machine containing the component predicted to fail, the operation program generation unit 55 creates the operation program so that the operation load is reduced. Further, the operation program generation unit 55 creates the operation programs of the other manufacturing machines so that the operation as reduced is added. The operation program generation unit 55 transmits the corresponding operation programs to the robot control apparatuses 2*a*, 2*b*, 2*c*.

In step 97, the robot control apparatuses 2*a*, 2*b*, 2*c* perform a control for updating the respective operation programs. The respective manufacturing machines 3*a*, 3*b*, 3*c* can perform the operation based on the operation programs updated. By adopting this control, the operation load of the manufacturing machine on which replacement of the component is predicted can be reduced. In addition, the operation as reduced can be performed by the other manufacturing machines. Consequently, a failure of the manufacturing machines before arrival of a substitute for a component to be replaced can be avoided.

The plurality of manufacturing machines included in the manufacturing cell according to the present embodiment are all a manufacturing machine which performs a welding operation. In other words, the manufacturing machines included in the manufacturing cell are formed in such a manner as to perform the same operation. As the manufacturing machines included in the manufacturing cell, which are not limited to the embodiment herein, a manufacturing machine which performs a different operation may be included.

In the present embodiment, as the manufacturing machines, the welding machines have been described as an example, which is, however, not limited to the embodiment herein, the present invention can be applied to an arbitrary manufacturing machine. For example, as the manufacturing machines, a conveying machine which conveys a workpiece, a painting machine which performs painting, a printing machine which performs printing, and the like can be illustrated. Further, as the manufacturing machines, a machine tool can be illustrated. The manufacturing cell can manufacture a predetermined product by cutting a material using a plurality of machine tools. Then, the present invention can be applied in a case in which at least a part of an operation of one machine tool can be performed by the other machine tool.

In the control as described above, the order of the steps can be suitably changed as long as the functions and effects are not changed.

The cell control apparatus and the production system of the present invention can predict a failure of a component and control the manufacturing machines in such a manner that a failure of the manufacturing machines does not occur until a time at which the component can be replaced.

The embodiments as described above can be suitably combined. In each drawing as described above, the same or corresponding components are assigned the same reference signs. Note that the embodiment as described above is illustrative and is not to limit the invention. Moreover, the embodiment includes modifications of the embodiments recited in the claims.

The invention claimed is:

1. A cell control apparatus which controls a manufacturing cell including a plurality of manufacturing machines, the cell control apparatus comprising:
    an operation information acquisition unit which acquires respective operation information of each of the manufacturing machines;
    a failure prediction unit which predicts a failure time of a component of at least one of the manufacturing machines based on the respective operation information of the at least one of the manufacturing machines and transmits information on the component predicted to fail to a component management apparatus which performs management of a component of the at least one of the manufacturing machines;
    a replacement time acquisition unit which acquires a replacement time which is a time at which the component can be replaced from the component management apparatus; and
    a work adjustment unit which judges whether or not the failure time is earlier than the replacement time, and performs a control for reducing and continuing an operation in the at least one of the manufacturing machines on which a failure of the component is predicted so that the failure time is later than the replacement time and a control for performing the operation as reduced in at least one other of the manufacturing machines when the failure time is earlier than the replacement time.

2. The cell control apparatus according to claim 1, wherein the work adjustment unit creates an operation program of the at least one of the manufacturing machines on which the failure of the component is predicted and an operation program of the at least one other of the manufacturing machines and transmits the operation programs to machine control apparatuses of the manufacturing machines.

3. A production system comprising:
    a manufacturing cell including a plurality of manufacturing machines; and
    a component management apparatus which performs management of components of the manufacturing machines;
    a cell control apparatus which controls the manufacturing cell including the plurality of manufacturing machines, the cell control apparatus comprising:
        an operation information acquisition unit which acquires respective operation information of each of the manufacturing machines;
        a failure prediction unit which predicts a failure time of a component of at least one of the manufacturing machines based on the respective operation information of the at least one of the manufacturing machines and transmits information on the component predicted to fail to the component management apparatus;
        a replacement time acquisition unit which acquires a replacement time which is a time at which the component can be replaced from the component management apparatus; and
        a work adjustment unit which judges whether or not the failure time is earlier than the replacement time, and performs a control for reducing and continuing an operation in the at least one of the manufacturing machines on which a failure of the component is predicted so that the failure time is later than the replacement time and a control for performing the operation as reduced in at least one other of the manufacturing machines when the failure time is earlier than the replacement time,
    wherein the cell control apparatus transmits information on the component predicted to fail to the component management apparatus through a network and acquires the replacement time from the component management apparatus.

* * * * *